United States Patent [19]
Horn

[11] Patent Number: 5,385,010
[45] Date of Patent: Jan. 31, 1995

[54] CRYOGENIC COOLER SYSTEM

[75] Inventor: Stuart B. Horn, Fairfax, Va.

[73] Assignee: The United States of America as represented by the Secretary of the Army, Washington, D.C.

[21] Appl. No.: 166,192

[22] Filed: Dec. 14, 1993

[51] Int. Cl.⁶ ............................................. F25B 9/00
[52] U.S. Cl. ..................................... 62/6; 62/298; 62/383; 62/51.1
[58] Field of Search ................. 62/6, 383, 51.1, 298; 165/32

[56] References Cited

U.S. PATENT DOCUMENTS

| | | | |
|---|---|---|---|
| 3,112,877 | 12/1963 | Snelling | 165/32 |
| 3,414,050 | 12/1968 | Anand | 165/32 |
| 3,430,455 | 3/1969 | Stuart et al. | 62/383 |
| 3,450,196 | 6/1969 | Bauer | 165/32 |
| 3,517,730 | 6/1970 | Wyatt | 165/32 |
| 3,525,229 | 8/1970 | Denhoy | 62/55.5 |
| 3,602,429 | 8/1971 | Levedahl | 165/32 |
| 4,008,579 | 2/1977 | Horvay | 165/32 |
| 4,689,970 | 9/1987 | Ohguma et al. | 62/383 X |
| 4,770,004 | 9/1988 | Lagodmos | 62/383 |
| 5,111,665 | 5/1992 | Ackermann | 62/6 |

*Primary Examiner*—Christopher Kilner
*Attorney, Agent, or Firm*—Milton W. Lee; Alain L. Bashore; Anthony T. Lane

[57] ABSTRACT

A cryogenic cooler system which allows continuous and uninterrupted cooling within the system with minimized moving parts. A compressor assembly is included with more than one compressor so that at any one time, one of the compressors is active so as to provide a working gas pressure modulated by piston action. An expander assembly includes an expander associated with each compressor where working gas pressure expansion from the active compressor is expanded within. A conduit line couples each compressor to each expander for working gas connection between each compressor and respective expander. Heat pipe is coupled at one end to each expander for the transfer a coolant fluid to a cooling plate which includes a temperature sensor. Thermal switches within each of the heat pipes control coolant fluid flow to allow the activation of another heat pipe and associated compressor when failure of the currently operating compressor occurs.

1 Claim, 3 Drawing Sheets

CRYOGENIC COOLER SYSTEM

BACKGROUND OF THE INVENTION

1. Field of the Invention

The present invention generally relates to cryogenic coolers and more specifically, to cryogenic cooler systems capable of continuous and uninterrupted cooling within the system.

2. Description of Prior Art

Cryogenic cooling in certain applications require continuous and uninterrupted cooling within the cooler system. Previous applications include: space experiments, surveillance, and strategic defense sensors. One type of space application of cryogenic cooling requires continuous cooling to cryogenic temperatures for 5–10 years. Space applications have long life requirements since repair is not realistic. This life requirement has caused a major problem since the typical operating time of the cryogenic cooling is on the order of 50,000–90,000 hours. In addition, a high coefficient of performance (COP) is required because input power requirements aboard a spacecraft must be minimized. A cryogenic cooler, which has shown the highest COP at cryogenic temperatures, is the Stirling cycle and its derivatives. However, the life requirement has led to new variations of this cooler which are very expensive to produce and large in size.

In the prior art, the Oxford-type, diaphragm compressor, and magnetic bearing, have all been tried as ways to eliminate surfaces from contacting each other. The Oxford devices use two dimensional springs to create a non-contact clearance seal for a linear drive system. Similarly, magnetic bearings also use magnetic fields to eliminated rubbing surfaces. These approaches have been successful but at a price of 100 times the cost of the prior art Stirling cooler. In addition to the extra weight, these cooler approaches are not applicable to systems where large quantities of coolers are needed because of cost and size. Many systems require hand fitted tolerances and have still not demonstrated the required reliability when environmental conditions are factored in.

While the prior art has reported using cryogenic coolers, none have established a basis for a specific apparatus that is dedicated to the task of resolving the particular problem at hand. What is needed in this instance is a cryogenic cooler system capable of continuous and uninterrupted cooling within the system with minimized moving parts.

SUMMARY OF THE INVENTION

It is therefore the object of the invention to provide a cryogenic cooler system capable of continuous and uninterrupted cooling within the system with minimized moving parts.

According to the invention, there is disclosed a cryogenic cooler system which provides cryogenic temperatures capable of continuous and uninterrupted cooling within the system with minimized moving parts. A compressor assembly includes more than one compressor so that at any one time, one of the compressors is an active compressor provide a working gas pressure modulated by piston action of the working compressor. An expander assembly means includes an expander associated with each compressor where working gas pressure expansion from the active compressor is expanded within. A conduit line couples each compressor to each expander for working gas connection between each compressor and respective expander. Heat pipe is coupled at one end to each expander for the transfer a coolant fluid to a cooling plate which includes a temperature sensor.

Thermal switches within each of the heat pipes control coolant fluid flow to allow the activation of another heat pipe and associated compressor when a failure of a current compressor occurs. When one of the compressors cease to operate, another compressor is powered and its associated thermal switch is activated whereby upon sensing a temperature threshold level by the temperature sensing means, the associated thermal switch of the previous compressor is closed to effect continuous and uninterrupted cooling within the system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
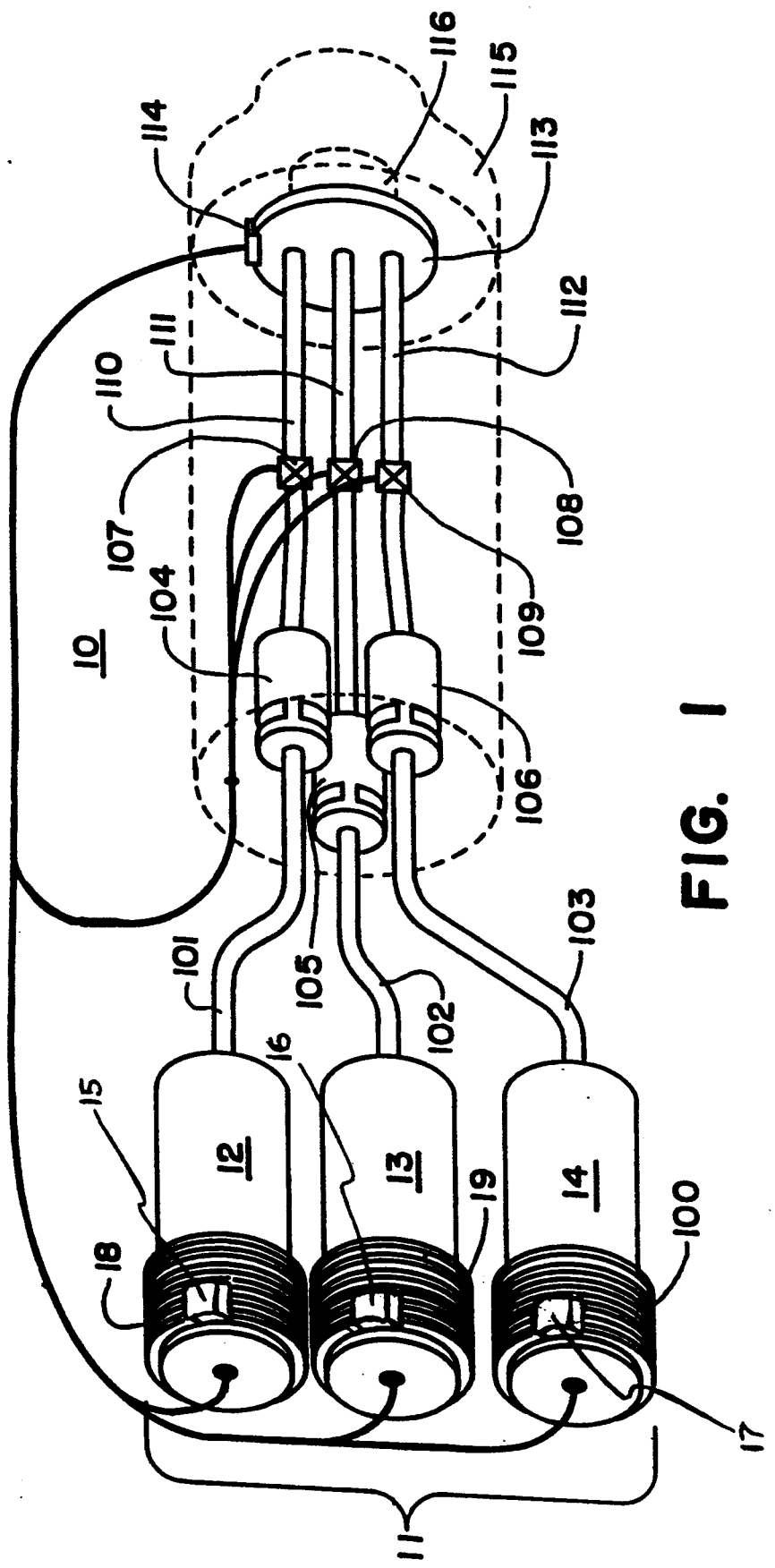
FIG. 1 is a perspective view of the cryogenic cooler system utilized with a dewar cooler module of an infrared imaging system.

Referring now to the drawings, and more particularly to FIG. 1, there is shown in perspective view the components of the cryogenic cooler system generally designated as system 10. System 10 includes bundled compressors 11 which consist in the preferred embodiment of compressors 12 through 14 shown in FIG. 1, each with associated electronics modules 15–17 respectfully. Heat from compressors 12–14 are dissipated by convection through heat fins 18, 19, and 100 located on each compressor housing respectfully. Connecting lines 101, 102, and 103 intercouple compressors 12 through 14 to respective cold fingers 104 through 106. Sensor heat load and thermal switches 107 through 109 are each located within one of each of heat pipes 110, 111 and 112. The heat pipe conveys the cooler working fluid from the cold finger to cold plate 113, and temperature sensor 114 is coupled to cold plate 113 for sensing the cold plate temperature.

The system of the present invention allows for a continuous cryogenic cooling load to be supplied to a particular application. In FIG. 1 the application in a first preferred embodiment is shown in outline as dewar assembly 115 including sensor 116 within the vacuum space of dewar assembly 115. The cooling load applied by cooler 10 to cooling plate 113 is utilized to cool sensor 116 which is coupled to cooling plate 113. While the preferred embodiment is described in terms of three linear drive stirling cycle coolers and associated elements, it is understood that a multiplicity of cryogenic coolers may be connected to a cooling load via a corresponding multiplicity of cryogenic heat pipes and thermal switches. The number of compressors, cold fingers, and associated elements would be determined by such factors as the reliability of the mission divided by the reliability of the cooler.

The operation of cryogenic cooler system 10 of FIG. 1 is begun by activation of power to compressor 12 by a common power source. Thermal switch 107 is activated allowing heat pipe 110 to transmit heat from cold plate 113 to coldfinger 104. When the temperature sensed by temperature sensor 114 exceeds a threshold temperature, then compressor 13 is powered and thermal switch 108 is opened. Conventional means is present for compressor 12 (which has malfunctioned) to turned off and thermal switch 107 closed. This process continues after each cooler failure. If the failure of compressors 12 through 14 is due to gaseous contamination, the pause in operation will allow the failed cooler to operate fully again at a later time.

Figure 2:
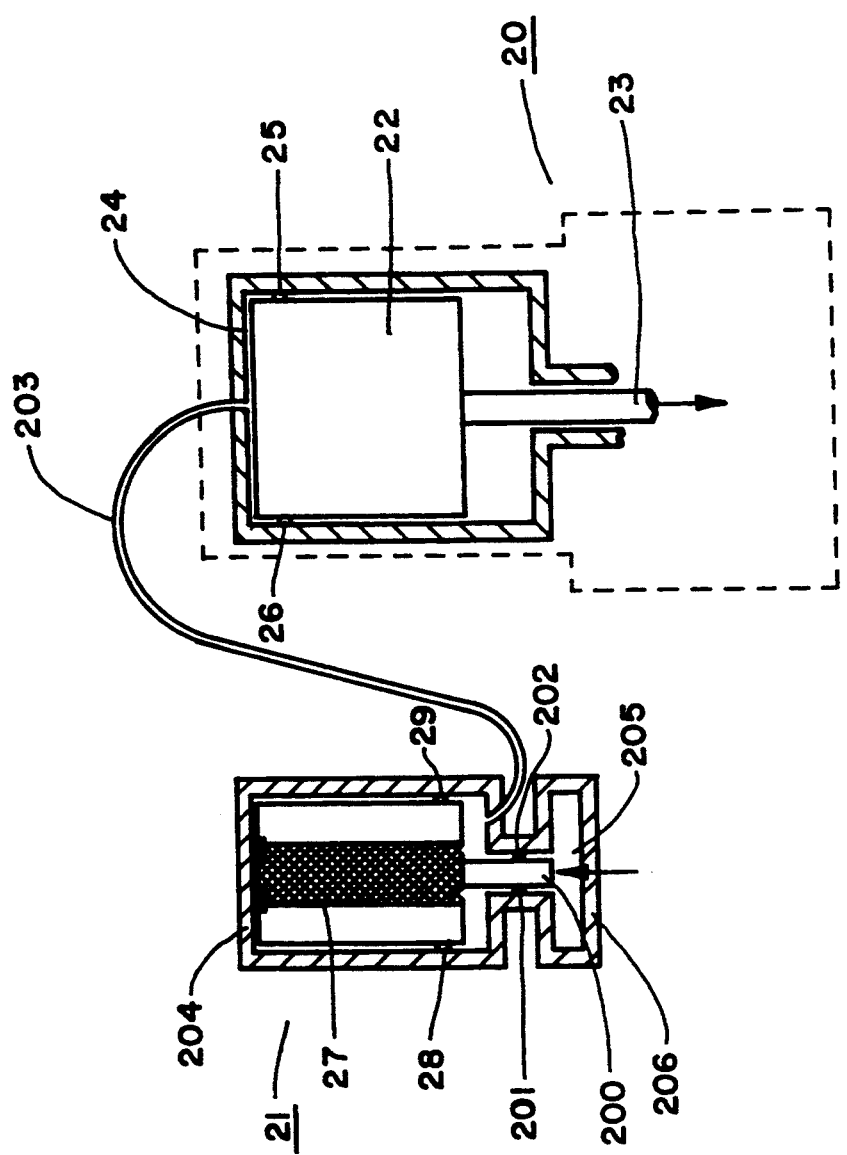
FIG. 2 is a cutaway front view of the compressor and cold finger of the cryogenic cooler system of FIG. 1.

FIG. 2 shows a cutaway front view of compressor 20 and cold finger 21 of the linear drive Stirling cycle type utilized in the space cryogenic cooler of FIG. 1. Compressor 20 of FIG. 2 features compression pistons 22 coupled a linear drive oscillating motor (not shown) via piston 23. In the preferred embodiment, compressor 40 measures seven inches in length, with a maximum diameter of three inches, and weighs about five pounds.

Cold finger 21 of FIG. 2 features a low mass displacer assembly which includes cold regenerator 27 with seals 28 and 29 and pneumatic piston 200 with seals 201 and 202. The working gas pressure, which is modulated by the piston action of compressor 20 is input through cooler line 203 to provide an second active force on cold regenerator 27 via pneumatic piston 200. As the working gas pressure increases, an increasing force is applied to the pneumatic piston 200 which acts against an opposing force exerted by the gas pressure in pneumatic volume 205. The net force caused by the working gas pressure (when there exceeds the pneumatic and frictional forces) tends to move regenerator 27 toward end 206. When the working pressure is at a maximum, regenerator 27 is pushed all the way to end. As the working gas pressure begins to decrease due to the recession of piston 22, the pneumatic force becomes greater than the force supplied by the working gas and frictional seal and flow forces such that regenerator 27 begins to move away from end 206. Because mass of the regenerator is so light, typically 0.03 lbs. and the displacer stroke is typically 0.100 inches, the time required to sweep out the pneumatic volumes is small compared to the compressor cycle time. It is understood that the assembly within cold finger 21 is not limited to the specific assembly described above but may be any means which provide an effective expander, such as a mechanically spring driven means.

Figure 3:
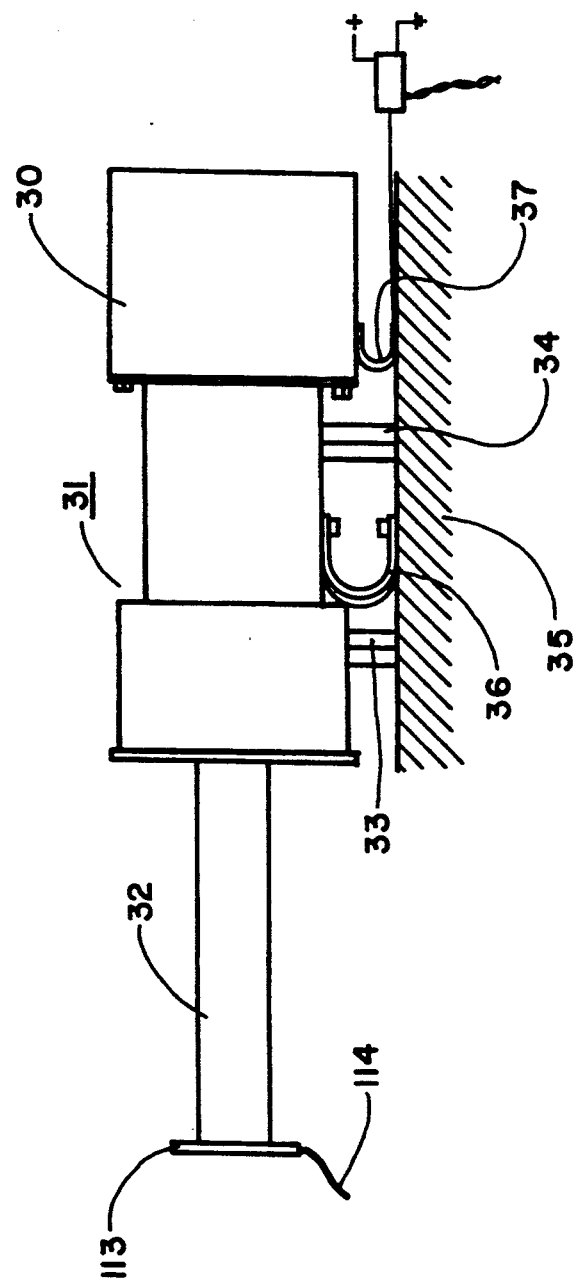
FIG. 3 is a side view of the cryogenic cooler system utilized as a space cryogenic cooler in a spacecraft.

FIG. 3 shows a side view of spacecraft interfaces of the cryogenic cooler system as a space cryogenic cooler in a second preferred embodiment of the present invention. The unit shown in FIG. 3 includes a stationary compressor module 30 containing bundled compressors and associated electronics. Compressor module 30 is coupled to housing 31 which contains the associated coldfingers, thermal switches of the present invention. Conduit assembly 32 coupled to module 31 transfers the working cooling fluid of the active coldfinger/compressor to cold plate 113. Flexible conductive strap 114 is coupled to cold plate 113 so as to transfer, by conductive cooling instead of convective cooling, the cold plate temperature to a sensor or other cooling load. The cooler bolts to the spacecraft structure at three mounting points, two of which are shown as mountings 33 and 34, with restrained compliant mounts integral to the cooler. These single degree of freedom soft mounts allow a 5 micro-meter uncompensated vibration along the expander axis while limiting the force transmitted to the spacecraft to less than 0.01 Newtons. Waste heat is sunk from the compressors to the spacecraft mounting plate 35 through three flexible straps, two of which are shown as straps 36 and 37. Straps 36 and 37 contain multiple layers of thin cooper shim and configured as rolling elements.

While this invention has been described in terms of preferred embodiment consisting of a cryogenic cooler system, those skilled in the art will recognize that the invention can be practiced with modification within the spirit and scope of the appended claims.

Having thus described my invention, what I claim as new and desire to secure by Letters Patent is as follows:

1. A cryogenic cooler system for providing substantially continuous and uninterrupted cryogenic cooling regardless of individual compressor functional failure including:

at least two cryogenic compressors, each including a compressor gas port and power coupling, where at any one time one of the compressors is active to provide a working gas pressure modulated by piston action of the working compressor to the compressor gas port;

an expander associated with each compressor, each expander including an expander gas port and a cooling surface, where working gas pressure expansion from the active compressor is expanded within the expander so as to cool the cooling surface thereon;

a first conduit means coupling each compressor gas port to each respective expander gas port to provide working gas connection between each compressor and associated expander;

a second conduit means coupled at one end to each expander cooling surface for the transfer of a coolant fluid therewithin so as to transfer cooling away from the expander cooling surface;

a means coupled to the other end of all second conduit means to provide a cooling load;

a temperature sensing means coupled to the means to provide a cooling load for sensing the temperature of the means to provide a cooling load;

a thermal switch means coupled to each of the second conduit means for controlling the coolant fluid flow therein;

a means for coupling all thermal switch means and power couplings to the temperature sensing means such that upon sensing a temperature threshold level by the temperature sensing means the currently operating compressor is no longer powered, and another compressor is simultaneously powered and its associated thermal switch activated, also the associated thermal switch of the previous compressor is closed whereby substantially continuous and uninterrupted cryogenic cooling to the means to provide a cooling load.

* * * * *